(12) United States Patent
Rutherford

(10) Patent No.: US 7,561,361 B1
(45) Date of Patent: Jul. 14, 2009

(54) DYNAMIC SYNCHRONIZATION OF TIMING SIGNALS

(75) Inventor: David Rutherford, San Jose, CA (US)

(73) Assignee: Marvell International Ltd., Hamilton (BM)

(\*) Notice: Subject to any disclaimer, the term of this patent is extended or adjusted under 35 U.S.C. 154(b) by 399 days.

(21) Appl. No.: 11/263,186

(22) Filed: Oct. 31, 2005

(51) Int. Cl.
*G11B 5/09* (2006.01)

(52) U.S. Cl. .............. 360/51; 360/29; 360/75; 360/77.11; 360/78.04

(58) Field of Classification Search ........ None
See application file for complete search history.

(56) References Cited

U.S. PATENT DOCUMENTS

| | | | | |
|---|---|---|---|---|
| 5,089,757 A * | 2/1992 | Wilson | | 318/560 |
| 5,278,702 A * | 1/1994 | Wilson et al. | | 360/51 |
| 5,450,249 A * | 9/1995 | Nagaraj et al. | | 360/46 |
| 5,668,679 A * | 9/1997 | Swearingen et al. | | 360/75 |
| 6,738,205 B1 * | 5/2004 | Moran et al. | | 360/17 |
| 6,920,004 B1 * | 7/2005 | Codilian et al. | | 360/51 |
| 7,019,937 B1 * | 3/2006 | Liikanen et al. | | 360/77.11 |
| 7,088,533 B1 * | 8/2006 | Shepherd et al. | | 360/51 |
| 7,199,956 B1 * | 4/2007 | Moser et al. | | 360/46 |
| 7,230,786 B1 * | 6/2007 | Ray et al. | | 360/75 |
| 7,230,789 B1 * | 6/2007 | Brunnett et al. | | 360/75 |
| 7,248,426 B1 * | 7/2007 | Weerasooriya et al. | | 360/51 |
| 7,333,286 B2 * | 2/2008 | Jung et al. | | 360/75 |
| 7,336,738 B2 * | 2/2008 | Wakamatsu | | 375/343 |
| 7,382,564 B1 * | 6/2008 | Everett et al. | | 360/75 |

\* cited by examiner

*Primary Examiner*—Hoa T Nguyen
*Assistant Examiner*—Dismery E Mercedes

(57) ABSTRACT

A synchronization system includes a signal generating module that generates a signal comprising modulated waveforms and a timing window generator that generates a timing window. A proportional integral controller (a) divides the timing window into a first half window and a second half window, (b) demodulates the digital signal in the first half window and the second half window, (c) compares an amplitude of demodulated signal in the first half window to an amplitude of demodulated signal in the second half window, (d) calculates a new location for the timing window, and (e) repeats (b), (c), and (d) until the amplitude in the first half window equals the amplitude in the second half window.

42 Claims, 11 Drawing Sheets

DYNAMIC SYNCHRONIZATION OF TIMING SIGNALS

FIELD OF THE INVENTION

The present invention relates to computer disk drives, and more particularly to dynamic synchronization of timing signals in disk drives.

BACKGROUND OF THE INVENTION

Host devices such as computers, laptops, personal video recorders (PVRs), MP3 players, game consoles, servers, set-top boxes, digital cameras, and/or other electronic devices often need to store a large amount of data. Storage devices such as hard disk drives (HDD) may be used to meet these storage requirements.

Referring now to FIG. 1, an exemplary hard disk drive (HDD) 10 is shown to include a hard disk drive (HDD) 12 and a hard drive assembly (HDA) 13. The HDA 13 includes one or more hard drive platters 14 that are collectively called a spindle. The platters 14 are coated with magnetic layers 15. The magnetic layers 15 store positive and negative magnetic fields that represent binary 1's and 0's. A spindle motor, shown schematically at 16, rotates the hard drive platters 14. Generally, the spindle motor 16 rotates the hard drive platters 14 at a fixed speed during read/write operations. One or more read/write actuator arms 18 moves relative to the hard drive platters 14 to read and/or write data to/from the hard drive platters 14.

A read/write device 20 is located near a distal end of the read/write arm 18. The read/write device 20 includes a write element such as an inductor that generates a magnetic field. The read/write device 20 also includes a read element (such as a magneto-resistive (MR) element) that senses the magnetic field on the platter 14. A preamp circuit 22 amplifies analog read/write signals.

When reading data, the preamp circuit 22 amplifies low level signals from the read element and outputs the amplified signal to a read/write channel device 24. When writing data, a write current is generated which flows through the write element of the read/write device 20. The write current is switched to produce a magnetic field having a positive or negative polarity. The positive or negative polarity is stored by the hard drive platter 14 and is used to represent data.

The HDD 12 typically includes a buffer 32 that stores data that is associated with the control of the hard disk drive and/or buffers data to allow data to be collected and transmitted as larger data blocks to improve efficiency. The buffer 32 may employ DRAM, SDRAM or other types of low latency memory. The HDD 12 further includes a processor 34 that performs processing that is related to the operation of the HDD 10.

The HDD 12 further includes a hard disk controller (HDC) 36 that communicates with a host device via an input/output (I/O) interface 38. The I/O interface 38 can be a serial or parallel interface, such as an Integrated Drive Electronics (IDE), Advanced Technology Attachment (ATA), or serial ATA (SATA) interface. The I/O interface 38 communicates with an I/O interface 44 that is associated with a host device 46.

The HDC 36 also communicates with a spindle/voice coil motor (VCM) driver 40 and/or the read/write channel device 24. The spindle/VCM driver 40 controls the spindle motor 16 that rotates the platters 14. The spindle/VCM driver 40 also generates control signals that position the read/write arm 18, for example using a voice coil actuator, a stepper motor or any other suitable actuator.

Referring now to FIG. 2, data is typically written on the platters 14 in concentric circles called tracks 50. The tracks 50 are divided radially into multiple sectors 52. As the diameter of the tracks 50 decreases toward the center of the platter 14, the sector size decreases. Before performing a read or a write operation on a sector of a track, a head locks onto the track by referring to positioning information called servo that is generally prewritten on the platters. The servo provides the positioning information so that the heads know where to write data on the platters 14 during a write operation and where to read data from during a read operation.

Traditionally, the servo is prewritten in multiple sectors using a special servo writing apparatus when a disk drive is manufactured. The traditional servo writing methods, however, become impractical as the track density, that is, the number of tracks per inch, increases for a disk drive. More recently, the track density has increased as the demand for storage capacity and spin rates of disk drives is increasing. Additionally, the diameter of disk platters is shrinking so that the drives can fit into smaller devices such as palmtops and other handheld devices that require disk drives that are small in physical size and high in storage capacity.

The increasing track density also makes traditional servo writing physically impractical. Accordingly, modern disk drives increasingly use self-servo-write (SSW) methods to write their own servo sectors using the same read/write heads that are used to read/write regular data. When writing the servo using the SSW methods, the heads typically lock onto reference servo sectors (RSS) that are prewritten on the platters in the form of spirals.

The spirals, however, are sometimes written imperfectly. Moreover, when reading the spirals, the spindle speed may fluctuate slightly. Additionally, the actuator arm may not be perfectly steady when locked onto an RSS. Consequently, a head may not be able to quickly and accurately lock onto an RSS as the head moves across a platter.

SUMMARY OF THE INVENTION

A synchronization system comprises a signal generating module that generates a signal comprising modulated waveforms and a timing window generator that generates a timing window. A proportional integral controller (a) divides the timing window into a first half window and a second half window, (b) demodulates the digital signal in the first half window and the second half window, (c) compares an amplitude of demodulated signal in the first half window to an amplitude of demodulated signal in the second half window, (d) calculates a new location for the timing window, and (e) repeats (b), (c), and (d) until the amplitude in the first half window equals the amplitude in the second half window.

In another feature, said modulated waveforms comprise one of amplitude modulated waveforms and frequency modulated waveforms.

In yet another feature, an analog-to-digital converter (ADC) converts said signal into a digital signal.

In another feature, the proportional integral controller determines that the timing window is synchronized to said signal when the amplitude in the first half window equals the amplitude in the second half window.

In another feature, the proportional integral controller generates a synchronization signal when the amplitude in the first half window equals the amplitude in the second half window.

In another feature, the proportional integral controller calculates said new location for the timing window by summing a bias term, a proportional error term, and an integral error term.

In yet another feature, a self-servo-write (SSW) system for writing servo on a disk drive magnetic medium, comprising the synchronization system of claim 1 and further comprises a read/write head and an SSW module that writes servo.

In another feature, said modulated waveforms comprise one of amplitude modulated waveforms and frequency modulated waveforms.

In yet another feature, an analog-to-digital converter (ADC) that converts said signal into a digital signal.

In another feature, the proportional integral controller determines that the timing window is synchronized to said signal when the amplitude in the first half window equals the amplitude in the second half window.

In another feature, the proportional integral controller generates a synchronization signal when the amplitude in the first half window equals the amplitude in the second half window.

In another feature, the proportional integral controller calculates said new location for the timing window by summing a bias term, a proportional error term, and an integral error term.

In yet another feature, a hard disk controller locks the read/write head when the proportional integral controller determines that the timing window is synchronized to said signal.

In yet another feature a synchronization computer program executed by a processor for synchronization of timing signals comprises generating a signal comprising modulated waveforms, generating a timing window, and (a) dividing the timing window into a first half window and a second half window, (b) demodulating the digital signal in the first half window and the second half window, (c) comparing an amplitude of demodulated signal in the first half window to an amplitude of demodulated signal in the second half window, (d) calculating a new location for the timing window, and (e) repeating (b), (c), and (d) until the amplitude in the first half window equals the amplitude in the second half window.

In another feature, said modulated waveforms comprise one of amplitude modulated waveforms and frequency modulated waveforms.

In another feature, the synchronization computer program comprises converting said signal into a digital signal.

In another feature, the synchronization computer program comprises determining that the timing window is synchronized to said signal when the amplitude in the first half window equals the amplitude in the second half window.

In another feature, the synchronization computer program comprises generating a synchronization signal when the amplitude in the first half window equals the amplitude in the second half window.

In another feature, the synchronization computer program comprises calculating said new location for the timing window by summing a bias term, a proportional error term, and an integral error term.

In yet another feature, a servo writing computer program executed by a processor for writing servo on a disk drive magnetic medium, comprising the synchronization computer program further comprises writing servo.

In another feature, said modulated waveforms comprise one of amplitude modulated waveforms and frequency modulated waveforms.

In another feature, the servo writing computer program comprises converting said signal into a digital signal.

In another feature, the servo writing computer program comprises determining that the timing window is synchronized to said signal when the amplitude in the first half window equals the amplitude in the second half window.

In another feature, the servo writing computer program comprises generating a synchronization signal when the amplitude in the first half window equals the amplitude in the second half window.

In another feature, the servo writing computer program comprises calculating said new location for the timing window by summing a bias term, a proportional error term, and an integral error term.

In another feature, the servo writing computer program comprises locking the read/write head when the proportional integral controller determines that the timing window is synchronized to said signal.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The present invention will become more fully understood from the detailed description and the accompanying drawings, wherein.

DETAILED DESCRIPTION OF THE PREFERRED EMBODIMENTS

Figure 1:
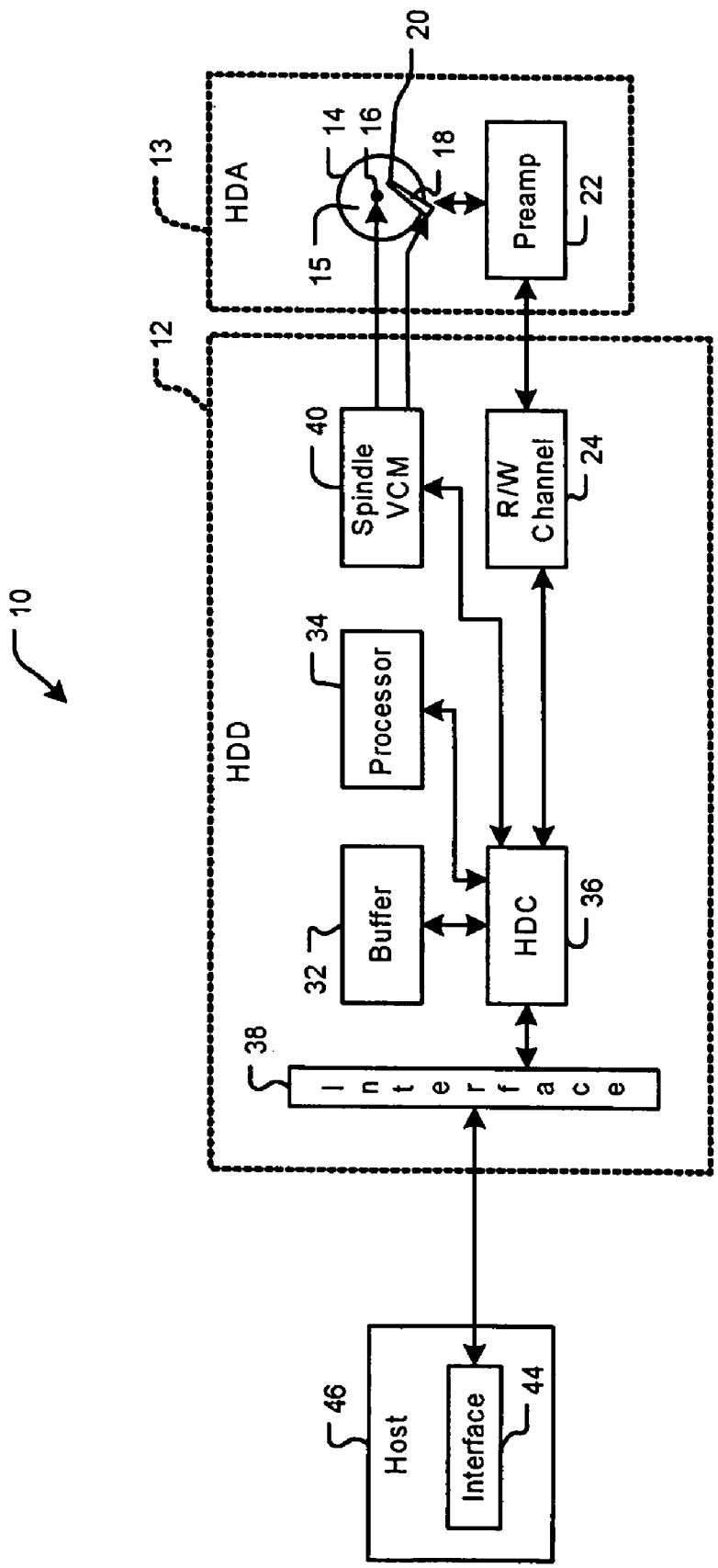
FIG. 1 is an exemplary functional block diagram of a disk drive according to the prior art.
Figure 2:
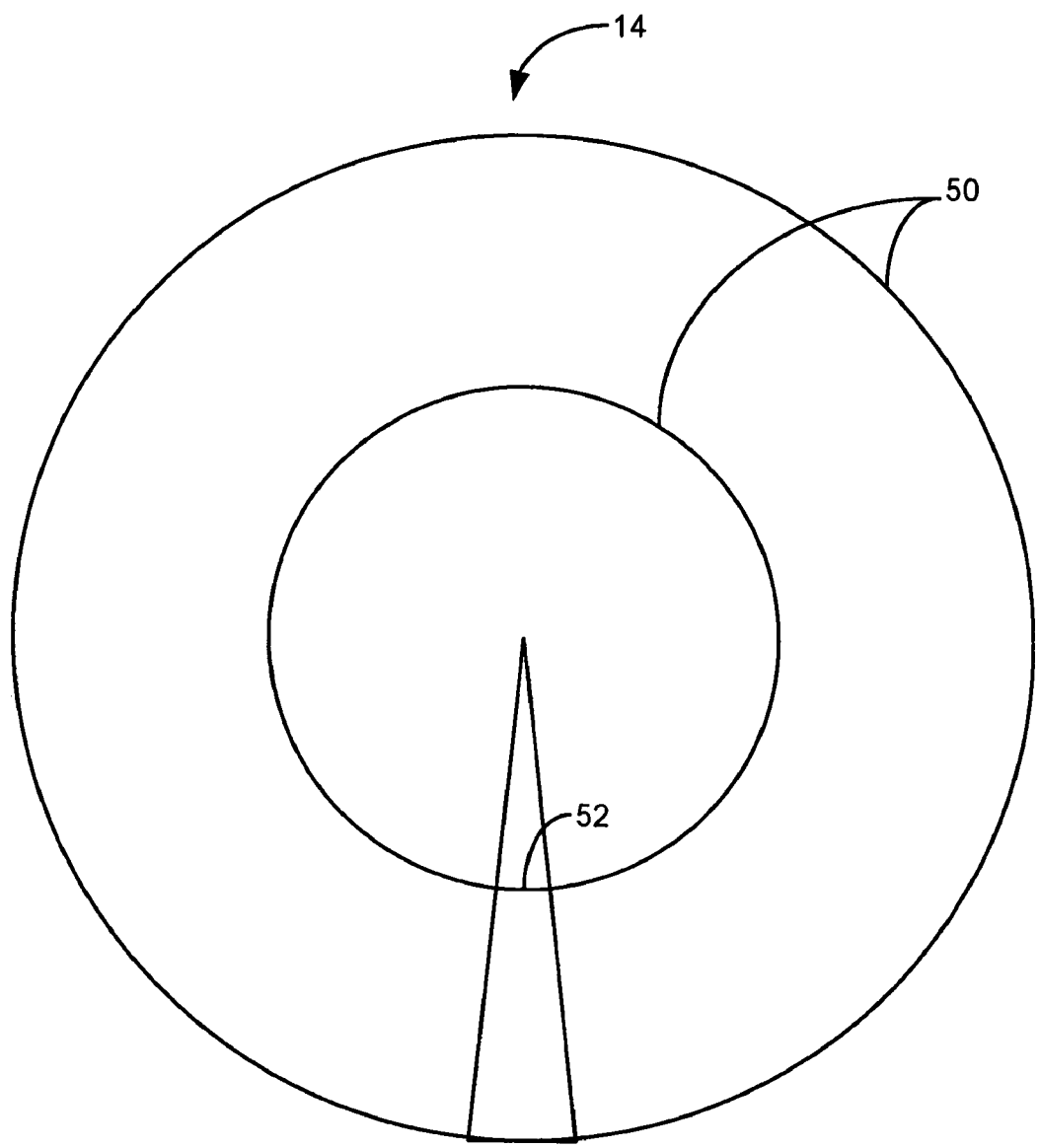
FIG. 2 is an exemplary illustration of tracks and sectors in a disk drive according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 3:
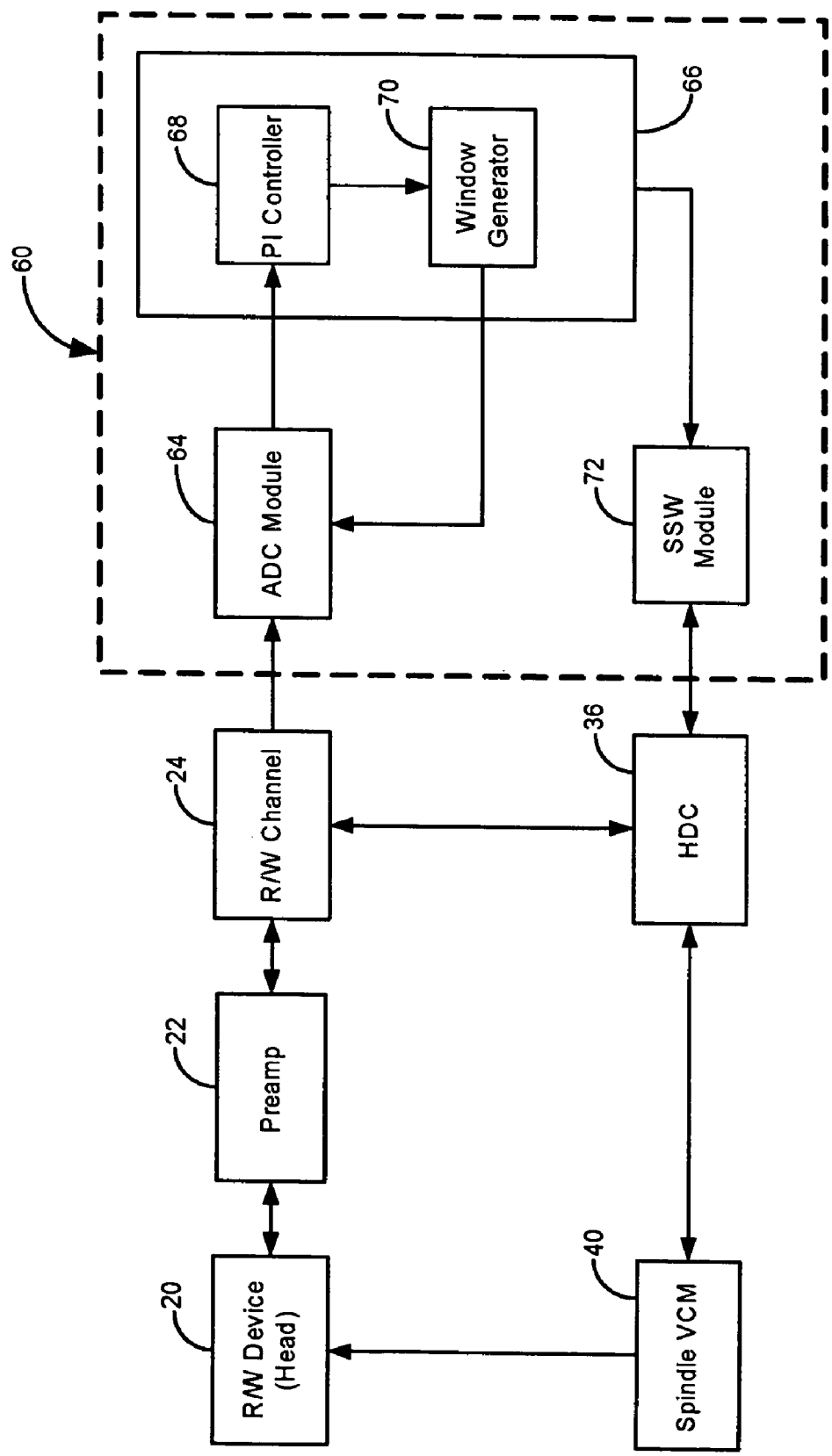
FIG. 3 is a functional block diagram of an exemplary system for dynamically synchronizing timing signals according to the present invention.

Referring now to FIG. 3, a system 60 for dynamically synchronizing timing signals is shown. A read/write head (head) 20 reads positioning information in a reference servo sector (RSS) that is prewritten typically in the form of spirals on a disk platter. The head 20 provides the RSS data in the form of signals that are amplitude modulated. A preamplifier module 22 amplifies the signals generated by the head 20 and outputs them to a read/write channel device 24. An analog-to-digital converter (ADC) module 64, in turn, converts the signals from analog to digital format.

The signals, that is, the RSS data, are generally amplitude modulated. A dynamic synchronization (sync) module 66 demodulates the amplitude data provided by the ADC module 64. The sync module 66 comprises a proportional/integral (PI) controller 68 and a window generator 70. The sync module 66 synchronizes the timing window to the center point of the RSS signal. Then the head is locked onto the RSS, and a self-servo-write (SSW) module 72 writes servo on the platter.

Figure 4A:
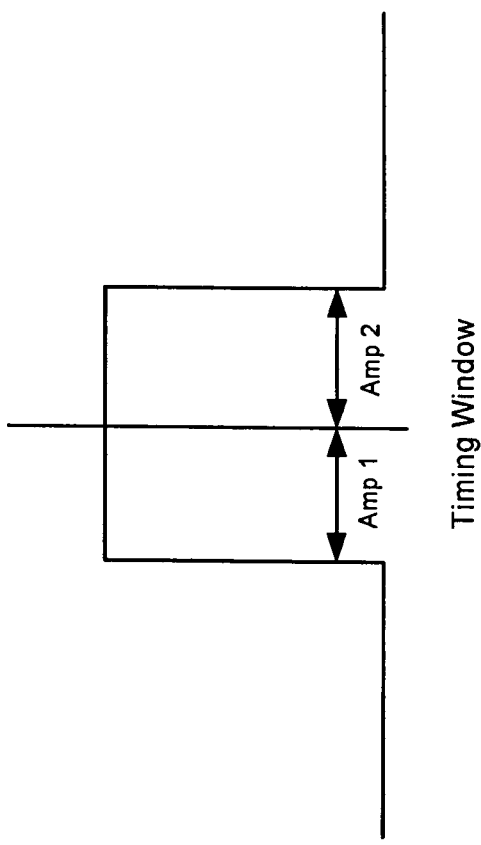
FIG. 4A illustrates a timing window according to the present invention.
Figure 4B:
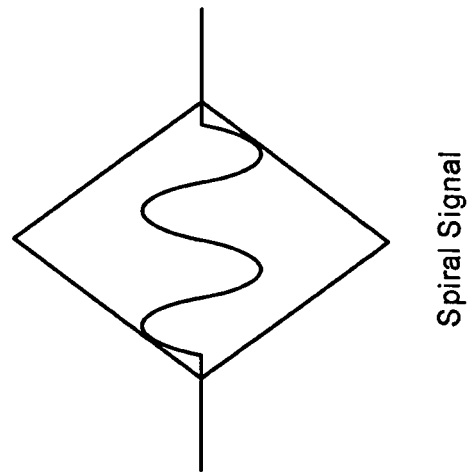
FIG. 4B illustrates a spiral signal (amplitude modulation is not shown)

Referring now to FIGS. 4A and 4B, the operation of the dynamic synchronization (sync) module 66 is explained in further detail. A timing window is essentially a square wave pulse, as shown in FIG. 4A. The timing window is divided into half. The amplitude value of the signal in the first half of the timing window is designated as $Amp_1$, or amplitude 1, and the amplitude value of the signal in the first half of the timing window is designated as $Amp_2$, or amplitude 2.

A head reads the data in an RSS and generates a signal that approximately resembles a diamond shape comprising multiple sinusoidal waveforms that are amplitude modulated, as shown in FIG. 4B (amplitude modulation is not shown). As the head moves over the blank area of the platter, the PI controller 68 generates a bias term. As the head moves over a spiral, the head reads the RSS data in the spiral and generates an amplitude modulated signal that the ADC module 64 converts into a digital format. The PI controller 68 demodulates the digital signal and generates a proportional and an integral error term.

The PI controller 68 uses the following formula to calculate a new location for the timing window:

Window Location=Bias Term+$K_p(|Amp_1-Amp_2|)$+$K_i(\Sigma(Amp_1-Amp_2))$, where, $K_p(|Amp_1-Amp_2|)$ is the proportional error term, $K_p$ is the proportional gain of the PI controller, $K_i(\Sigma(Amp_1-Amp_2))$ is the integral error term, and $K_i$ is the integral gain of the PI controller.

The bias term causes the timing window to scan across the blank area of the platter. The proportional error term causes the timing window to find the area of the platter with amplitude modulated data, that is, an RSS. The integral error term cancels the bias term when the timing window is centered on the area of the platter with amplitude modulated data.

The PI controller 68 calculates a window location that the window generator uses to read different parts of the stream of data provided by the ADC module 64. Thus, effectively, the PI controller 68 provides a location for the timing window to the window generator 70. The window generator 70, in turn, generates a timing window that reads different areas of the diamond of the spiral signal shown in FIG. 4B. A steady state is reached after the position of the timing window is modified N times based on the window location calculations, where N is an integer greater than 1.

Figure 5A:
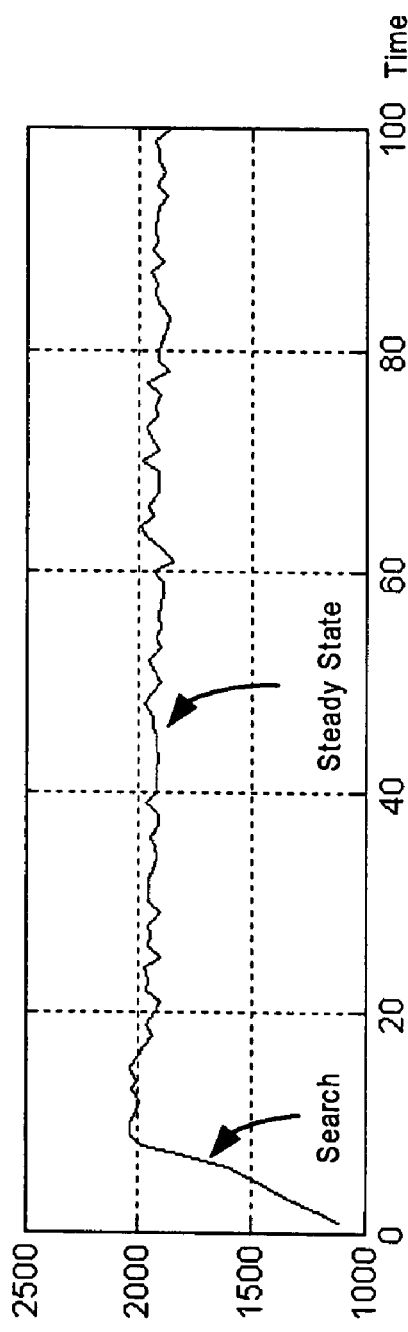
FIG. 5A is a graph of spiral window offset as a function of time for a spiral search followed by steady state operation according to the present invention.
Figure 5B:
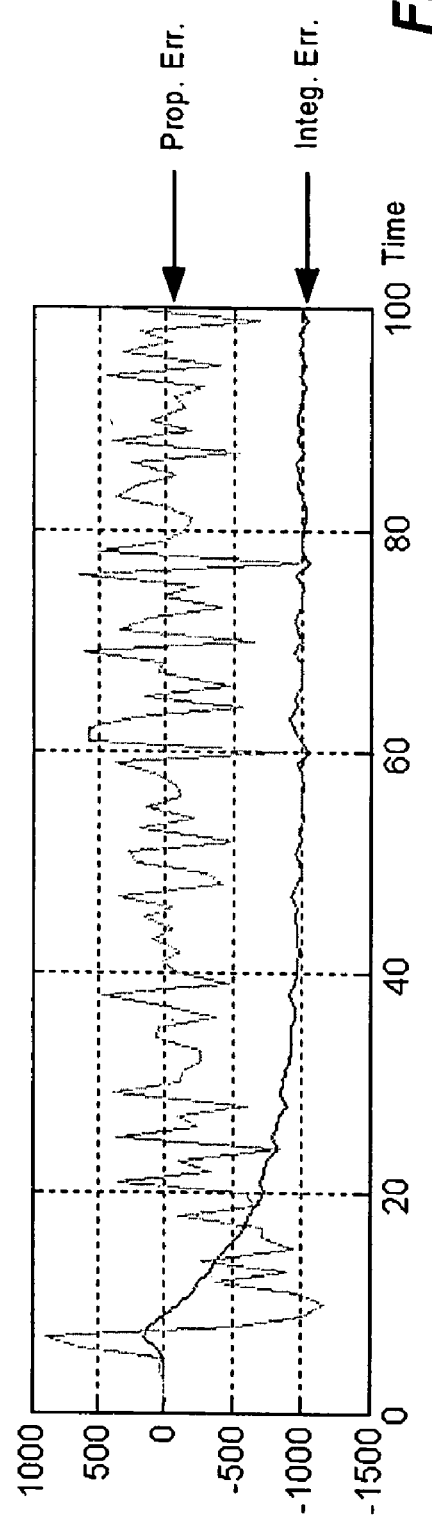
FIG. 5B is a graph of proportional and integral errors as functions of time that illustrates proportional error approaching zero and an integral error canceling bias term according to the present invention.

When steady state is reached, $Amp_1$ equals $Amp_2$. Additionally, the proportional error term becomes zero as shown in an example in FIG. 5A, and the integral error term nullifies or cancels the bias term as shown in an example in FIG. 5B. At that point, the timing window is centered on the RSS signal. The sync module 66 issues a lock head signal to the SSW module 72. The SSW module 72 utilizes a hard disk controller (HDC) module 36 and a spindle/VCM driver 40 to lock the relative position of the head and writes servo.

Although the sync module 66 and the SSW module 72 are shown separately for illustrative purpose, the modules may be implemented by a single module. Additionally, the sync module 66 and/or the SSW module 72 may be implemented by firmware. Moreover, the signal may be modulated differently such as frequency modulation etc.

Figure 6:
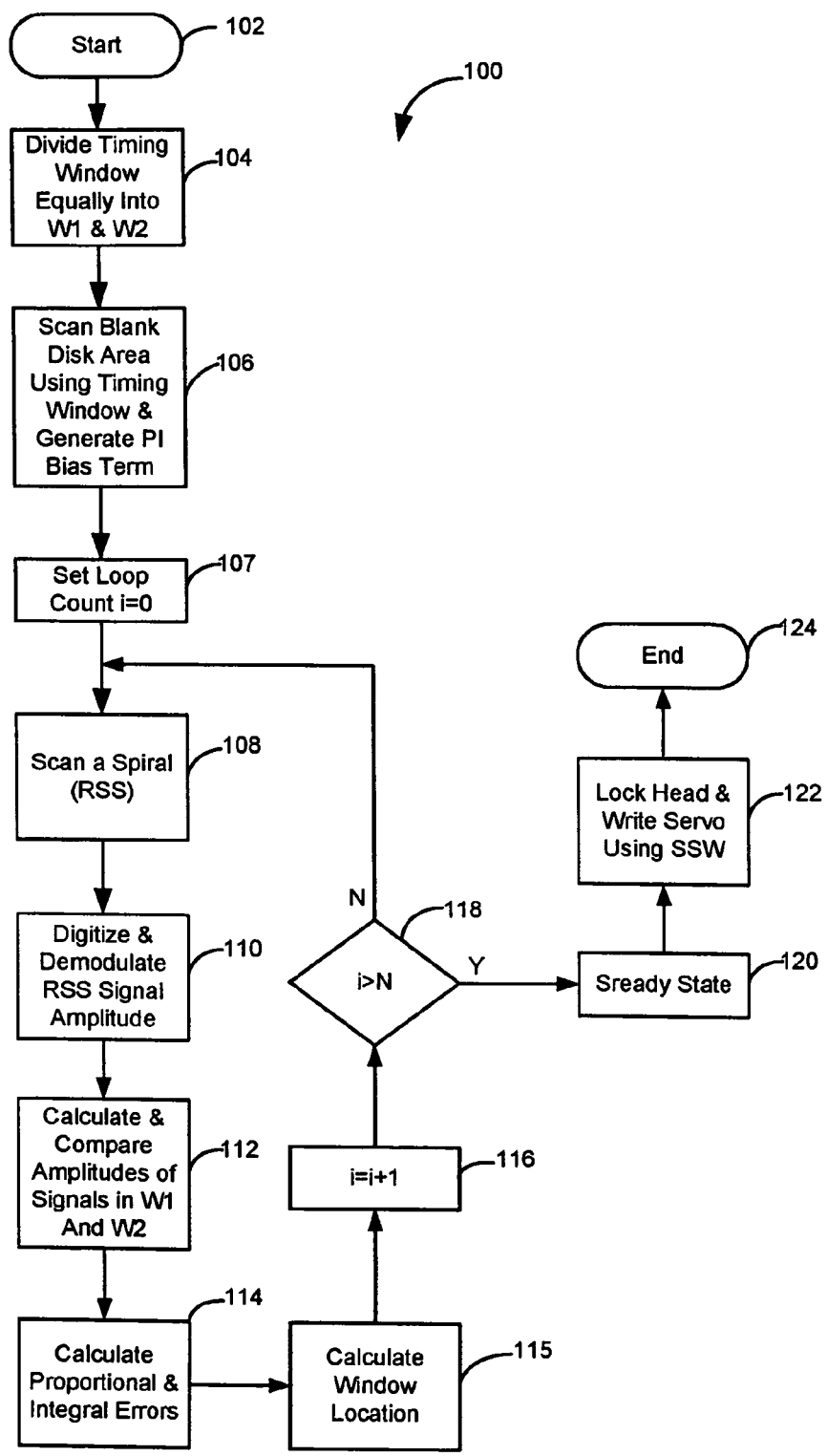
FIG. 6 is a flowchart illustrating an exemplary method for dynamically synchronizing timing signals according to the present invention.
Figure 7A:
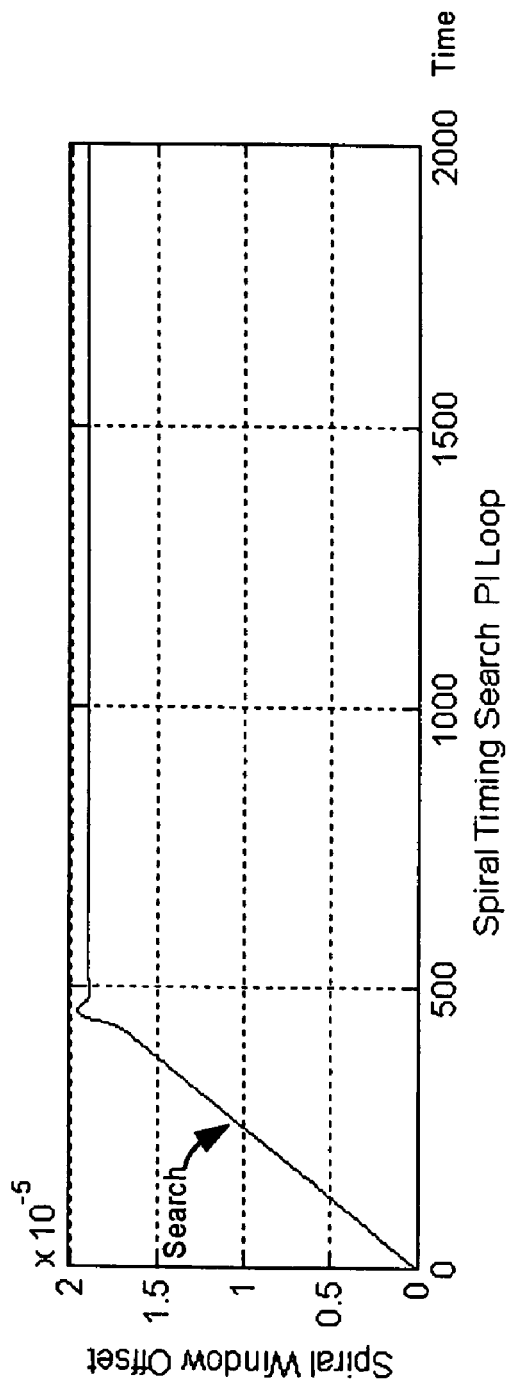
FIG. 7A is a graph of spiral window offset as a function of time for a simulated spiral search performed according to the present invention.

Referring now to FIG. 6, a method 100 for dynamically synchronizing timing signals is shown. The method begins at step 102. A timing window is divided into two halves $W_1$ and $W_2$ in step 104. A head 20 begins scanning a blank area of a platter, and a PI controller 68 generates a bias term for window location calculation in step 106. A sync module 66 sets a loop count i to 0 in step 107. The head 20 begins scanning a spiral and reading an RSS in step 108. A simulated test result for a spiral search is shown in FIG. 7A.

An ADC module 64 digitizes the amplitudes of the amplitude modulated RSS signal, and the PI controller 68 demodulates the RSS signal in step 110. $Amp_1$ denotes the amplitude of the signal in window $W_1$, and $Amp_2$ denotes the amplitude of the signal in window $W_2$. The PI controller 68 calculates $Amp_1$, and $Amp_2$, and compares $Amp_1$ to $Amp_2$ in step 112. If $Amp_1$ does not equal $Amp_2$, the PI controller 68 calculates the proportional error $K_p(|Amp_1-Amp_2|)$ and the integral error $K_i(\Sigma(Amp_1-Amp_2))$ in step 114. In step 115, the PI controller 68 calculates the new window location by adding the proportional and the integral errors to the bias term obtained in step 106.

Figure 7B:
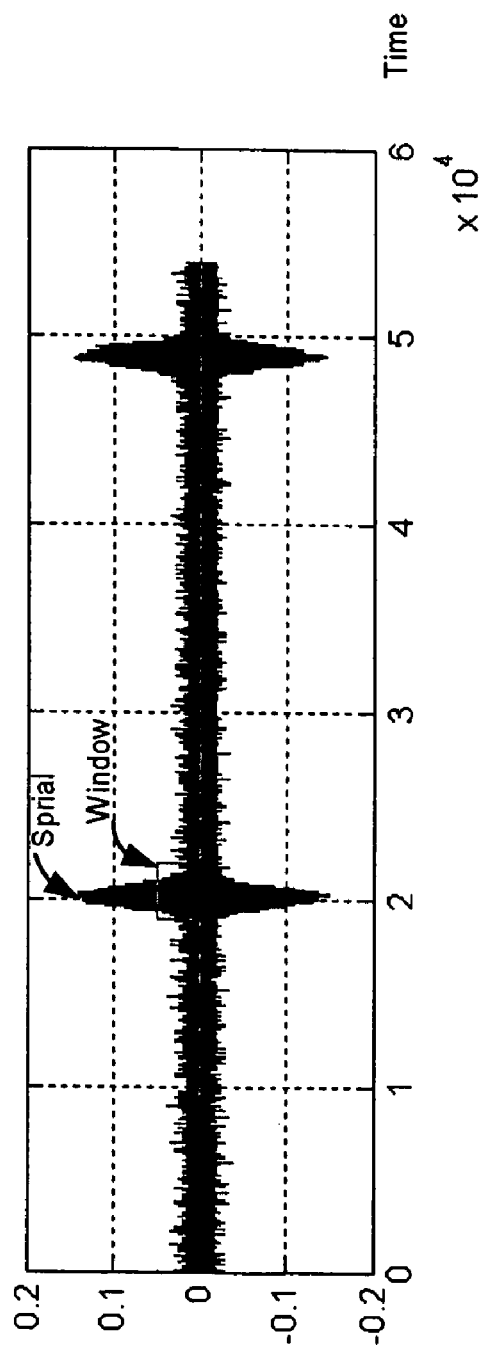
FIG. 7B illustrates an exemplary simulated result showing the final location of the timing window with respect to the spiral signal according to the present invention.

The sync module 66 increments the loop count i in step 116. In step 118, the sync module 66 determines whether the loop count i exceeds a predetermined number N, where N is an integer greater than 1. The sync module 66 repeats the loop from steps 108 through 118 if the loop count i does not exceed N. Otherwise, the PI controller 68 determines that a steady state is reached in step 120. When the stead state is reached, $Amp_1$ equals $Amp_2$, and the timing window is at the center of the RSS signal or the spiral, as shown in a simulated test result illustrated by FIG. 7B.

At that point, the timing window is synchronized to the RSS signal. The sync module 66 issues a lock head signal to an SSW module 72 in step 122. The SSW module 72 utilizes a hard disk controller (HDC) module 36 and a spindle/VCM driver 40 to lock the relative position of the head at the center of the RSS and writes servo. The algorithm ends in step 124.

Figure 8B:
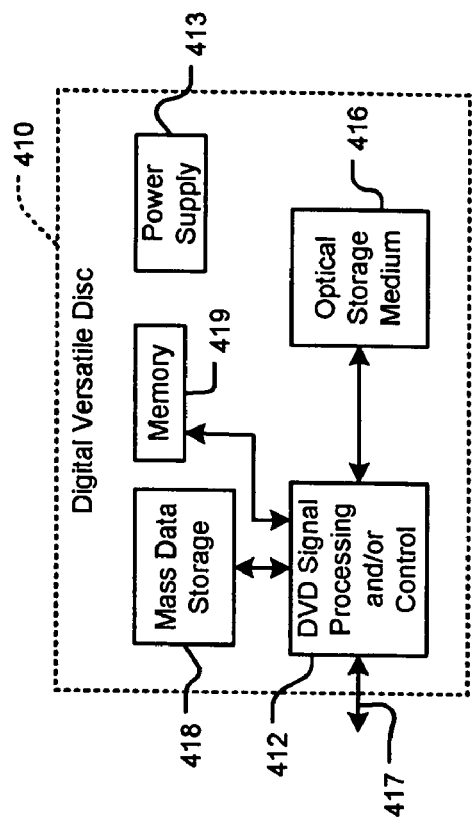
FIG. 8B is a functional block diagram of a digital versatile disk (DVD)
Figure 8A:
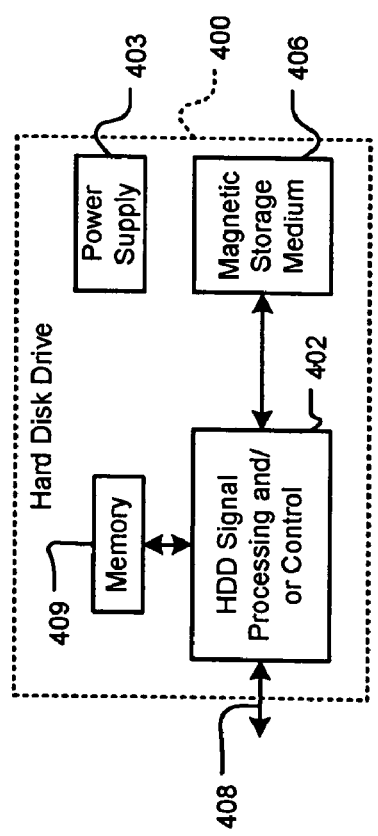
FIG. 8A is a functional block diagram of a hard disk drive.

Referring now to FIGS. 8A-8G, various exemplary implementations of the present invention are shown. Referring now to FIG. 8A, the present invention can be implemented in a hard disk drive 400. The present invention may be implemented in either or both signal processing and/or control circuits, which are generally identified in FIG. 8A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 8B, the present invention can be implemented in a digital versatile disc (DVD) drive 410. The present invention may be implemented in either or both signal processing and/or control circuits, which are generally identified in FIG. 8B at 412, and mass data storage 418 of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 8A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 8D:
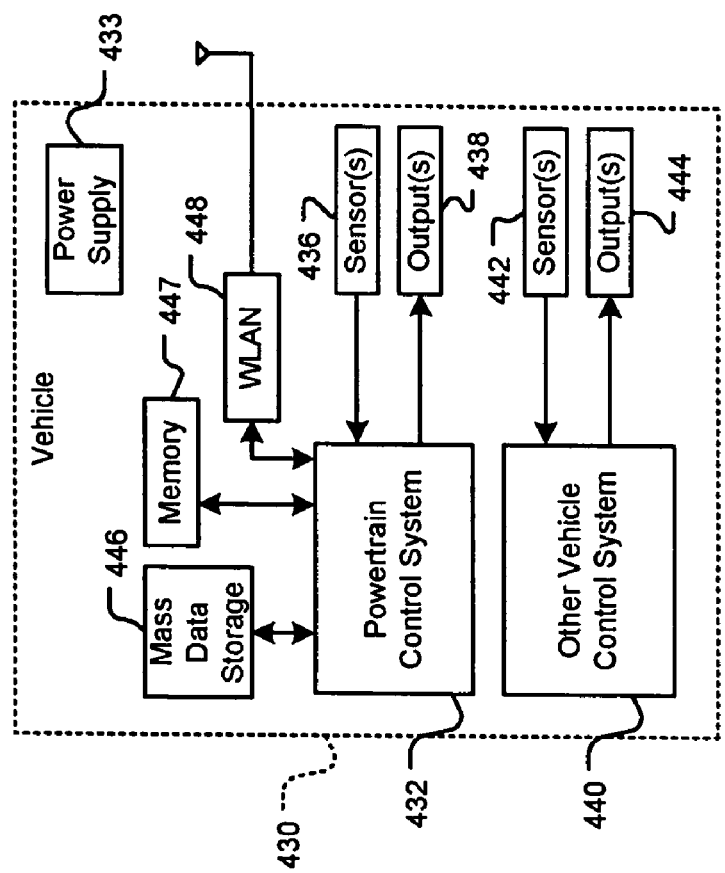
FIG. 8D is a functional block diagram of a vehicle control system.
Figure 8C:
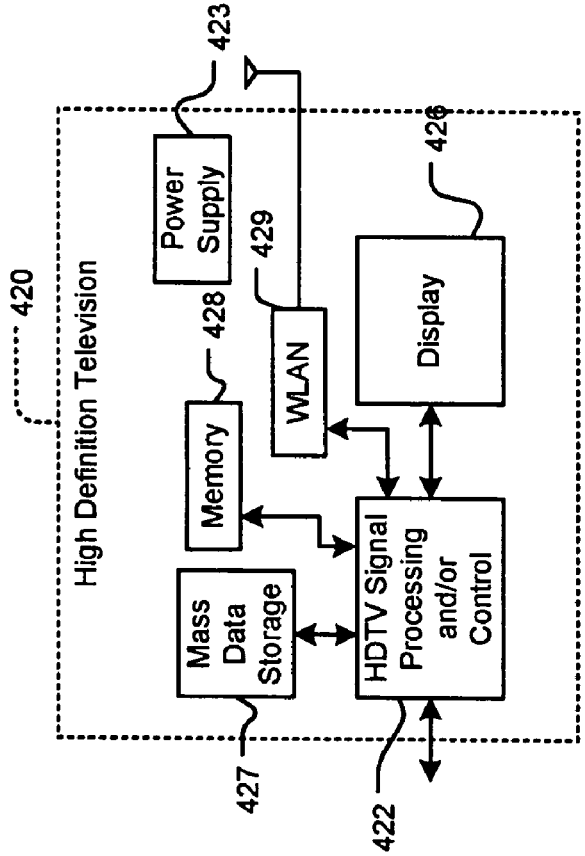
FIG. 8C is a functional block diagram of a high definition television.

Referring now to FIG. 8C, the present invention can be implemented in a high definition television (HDTV) 420. The present invention may be implemented in either or both signal processing and/or control circuits, which are generally identified in FIG. 8C at 422, and mass data storage 427 of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 9A and/or at least one DVD may have the configuration shown in FIG. 8B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 8D, the present invention may be implemented in a control system of a vehicle 430 and mass data storage 446 of the vehicle control system 430. In some implementations, the present invention may implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 8E:
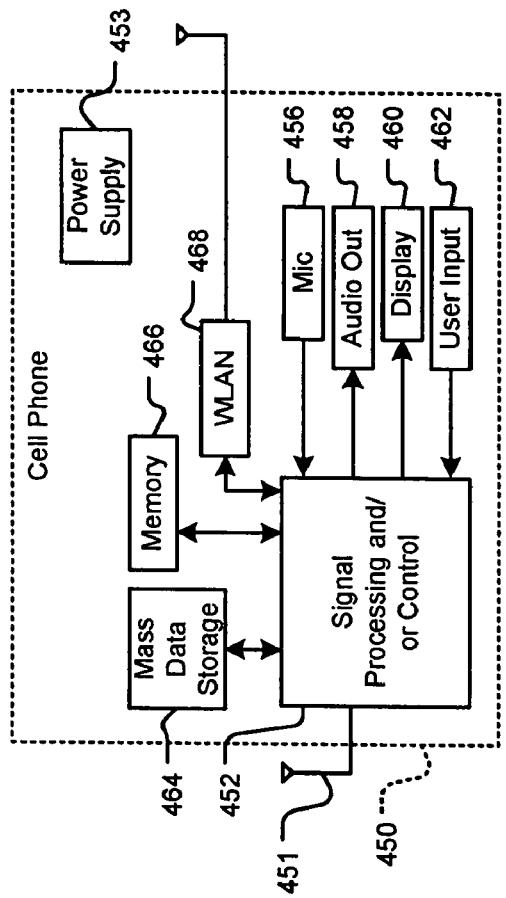
FIG. 8E is a functional block diagram of a cellular phone.

Referring now to FIG. 8E, the present invention can be implemented in a cellular phone 450 that may include a cellular antenna 451. The present invention may implement and/or be implemented in either or both signal processing and/or control circuits, which are generally identified in FIG. 8E at 452, and mass data storage 464 of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 8F:
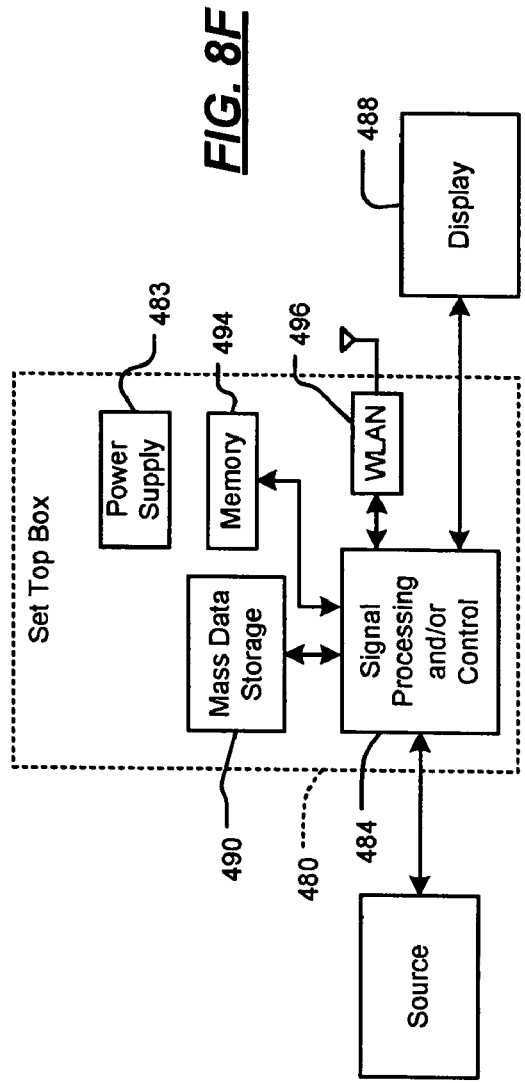
FIG. 8F is a functional block diagram of a set top box.

Referring now to FIG. 8F, the present invention can be implemented in a set top box 480. The present invention may be implemented in either or both signal processing and/or control circuits, which are generally identified in FIG. 8F at 484, and mass data storage 490 of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 8G:
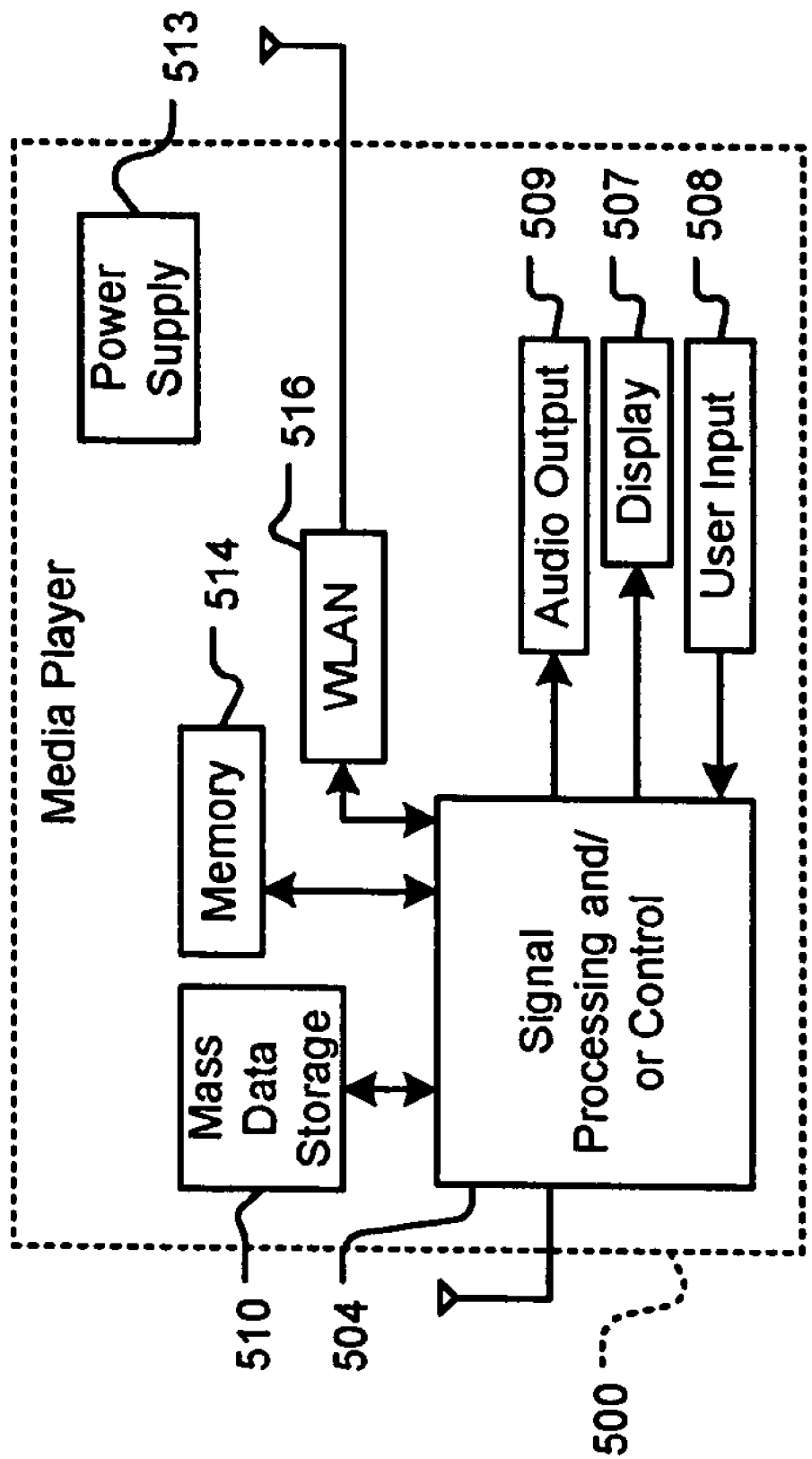
FIG. 8G is a functional block diagram of a media player.

Referring now to FIG. 8G, the present invention can be implemented in a media player 500. The present invention may be implemented in either or both signal processing and/or control circuits, which are generally identified in FIG. 8G at 504, and mass data storage 510 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A synchronization system, comprising:
a timing window generator that generates a timing window; and
a proportional integral controller that:
(a) divides the timing window into a first half window and a second half window;
(b) demodulates a signal comprising modulated waveforms in the first half window and the second half window when the timing window is at a first location relative to the signal;
(c) compares an amplitude of demodulated signal in the first half window to an amplitude of demodulated signal in the second half window;
(d) calculates a second location for the timing window based on the comparison; and
(e) repeats (b), (c), and (d) until the amplitude in the first half window equals the amplitude in the second half window.

2. The synchronization system of claim 1 wherein said modulated waveforms comprise one of amplitude modulated waveforms and frequency modulated waveforms.

3. The synchronization system of claim 1 further comprising an analog-to-digital converter (ADC) that converts said signal into a digital signal.

4. The synchronization system of claim 1 wherein the proportional integral controller determines that the timing window is synchronized to said signal when the amplitude in the first half window equals the amplitude in the second half window.

5. The synchronization system of claim 1 wherein the proportional integral controller generates a synchronization signal when the amplitude in the first half window equals the amplitude in the second half window.

6. The synchronization system of claim 1 wherein the proportional integral controller calculates said second location for the timing window by summing a bias term, a proportional error term, and an integral error term.

7. The synchronization system of claim 1 wherein said signal includes a spiral signal generated by reading a reference servo sector.

8. A self-servo-write (SSW) system for writing servo on a disk drive magnetic medium, comprising the synchronization system of claim 1 and further comprising:
a read/write head; and
an SSW module that writes servo.

9. The SSW system of claim 8 wherein said modulated waveforms comprise one of amplitude modulated waveforms and frequency modulated waveforms.

10. The SSW system of claim 8 further comprising an analog-to-digital converter (ADC) that converts said signal into a digital signal.

11. The SSW system of claim 8 wherein the proportional integral controller determines that the timing window is synchronized to said signal when the amplitude in the first half window equals the amplitude in the second half window.

12. The SSW system of claim 8 wherein the proportional integral controller generates a synchronization signal when the amplitude in the first half window equals the amplitude in the second half window.

13. The SSW system of claim 8 wherein the proportional integral controller calculates said second location for the timing window by summing a bias term, a proportional error term, and an integral error term.

14. The SSW system of claim 8 further comprising a hard disk controller that locks the read/write head when the proportional integral controller determines that the timing window is synchronized to said signal.

15. A synchronization method for synchronization of timing signals, comprising:
   generating a timing window; and
   (a) dividing the timing window into a first half window and a second half window;
   (b) demodulating a signal comprising modulated waveforms in the first half window and the second half window when the timing window is at a first location relative to the signal;
   (c) comparing an amplitude of demodulated signal in the first half window to an amplitude of demodulated signal in the second half window;
   (d) calculating a second location for the timing window based on the comparison; and
   (e) repeating (b), (c), and (d) until the amplitude in the first half window equals the amplitude in the second half window.

16. The synchronization method of claim 15 wherein said modulated waveforms comprise one of amplitude modulated waveforms and frequency modulated waveforms.

17. The synchronization method of claim 15 further comprising converting said signal into a digital signal.

18. The synchronization method of claim 15 further comprising determining that the timing window is synchronized to said signal when the amplitude in the first half window equals the amplitude in the second half window.

19. The synchronization method of claim 15 further comprising generating a synchronization signal when the amplitude in the first half window equals the amplitude in the second half window.

20. The synchronization method of claim 15 further comprising calculating said second location for the timing window by summing a bias term, a proportional error term, and an integral error term.

21. The method of claim 15 wherein said signal includes a spiral signal generated by reading a reference servo sector.

22. A servo writing method for writing servo on a disk drive magnetic medium, comprising the synchronization method of claim 15 and further comprising writing servo.

23. The servo writing method of claim 22 wherein said modulated waveforms comprise one of amplitude modulated waveforms and frequency modulated waveforms.

24. The servo writing method of claim 22 further comprising converting said signal into a digital signal.

25. The servo writing method of claim 22 further comprising determining that the timing window is synchronized to said signal when the amplitude in the first half window equals the amplitude in the second half window.

26. The servo writing method of claim 22 further comprising generating a synchronization signal when the amplitude in the first half window equals the amplitude in the second half window.

27. The servo writing method of claim 22 further comprising calculating said second location for the timing window by summing a bias term, a proportional error term, and an integral error term.

28. The servo writing method of claim 22 further comprising locking the read/write head when the proportional integral controller determines that the timing window is synchronized to said signal.

29. A synchronization system, comprising:
   timing window generating means for generating a timing window; and
   proportional integral controller means for:
   (a) dividing the timing window into a first half window and a second half window;
   (b) demodulating a signal comprising modulated waveforms in the first half window and the second half window when the timing window is at a first location relative to the signal;
   (c) comparing an amplitude of demodulated signal in the first half window to an amplitude of demodulated signal in the second half window;
   (d) calculating a second location for the timing window based on the comparison; and
   (e) repeating (b), (c), and (d) until the amplitude in the first half window equals the amplitude in the second half window.

30. The synchronization system of claim 29 wherein said modulated waveforms comprise one of amplitude modulated waveforms and frequency modulated waveforms.

31. The synchronization system of claim 29 further comprising converting means for converting said signal into a digital signal.

32. The synchronization system of claim 29 wherein the proportional integral controller means determines that the timing window is synchronized to said signal when the amplitude in the first half window equals the amplitude in the second half window.

33. The synchronization system of claim 29 wherein the proportional integral means generates a synchronization signal when the amplitude in the first half window equals the amplitude in the second half window.

34. The synchronization system of claim 29 wherein the proportional integral controller means calculates said second location for the timing window by summing a bias term, a proportional error term, and an integral error term.

35. The SSW system of claim 29 wherein said signal includes a spiral signal generated by reading a reference servo sector.

36. A self-servo-write (SSW) system for writing servo on a disk drive magnetic medium, comprising the synchronization system of claim 29 and further comprising:
   read/write means for generating said signal; and
   writing means for writing servo.

37. The SSW system of claim 36 wherein said modulated waveforms comprise one of amplitude modulated waveforms and frequency modulated waveforms.

38. The SSW system of claim 36 further comprising converting means for converting said signal into a digital signal.

39. The SSW system of claim 36 wherein the proportional integral controller means determines that the timing window is synchronized to said signal when the amplitude in the first half window equals the amplitude in the second half window.

40. The SSW system of claim 36 wherein the proportional integral controller means generates a synchronization signal when the amplitude in the first half window equals the amplitude in the second half window.

41. The SSW system of claim 36 wherein the proportional integral controller means calculates said second location for the timing window by summing a bias term, a proportional error term, and an integral error term.

42. The SSW system of claim 36 further comprising hard disk controller means for locking the read/write means when the proportional integral controller means determines that the timing window is synchronized to said signal.

* * * * *